United States Patent [19]

Davis, Jr.

[11] 3,806,869

[45] Apr. 23, 1974

[54] RF RECEIVER FOR PNEUMATIC TIRE LOW PRESSURE MONITORING AND WARNING SYSTEM

[75] Inventor: Henry Davis, Jr., Richmond, Ind.

[73] Assignee: Avco Corporation, Richmond, Ind.M

[22] Filed: Sept. 15, 1972

[21] Appl. No.: 289,462

[52] U.S. Cl.............. 340/58, 325/111, 200/61.22
[51] Int. Cl............................................ B60c 23/04
[58] Field of Search........ 340/58; 325/15, 111, 117; 200/61.22, 61.25, 61.26

[56] References Cited
UNITED STATES PATENTS

| | | | |
|---|---|---|---|
| 3,694,803 | 9/1972 | Strenglein | 340/58 |
| 3,588,815 | 6/1971 | Koonce | 340/58 |
| 3,662,335 | 5/1972 | Fritze | 340/58 |
| 2,860,321 | 11/1958 | Strickland et al. | 340/58 |

Primary Examiner—Alvin H. Waring
Attorney, Agent, or Firm—Bertram H. Mann

[57] ABSTRACT

An improved RF receiver for pneumatic tire low pressure monitoring and warning system is provided which senses a low pressure condition in a pneumatic tire and employs a transmitter which is fixed to a rotatable support for rotation therewith. The transmitter is located off center from the central axis of rotation of the rotatable support and is actuated by sensing means to provide pulse modulated output signals at a radio frequency in response to a low pressure condition in the tire. A receiver is provided for receiving the signals and such receiver operates to improve the character of the output signals while removing undesirable signals and such receiver activates an indicating device in response to a low pressure condition in the pneumatic tire.

11 Claims, 12 Drawing Figures

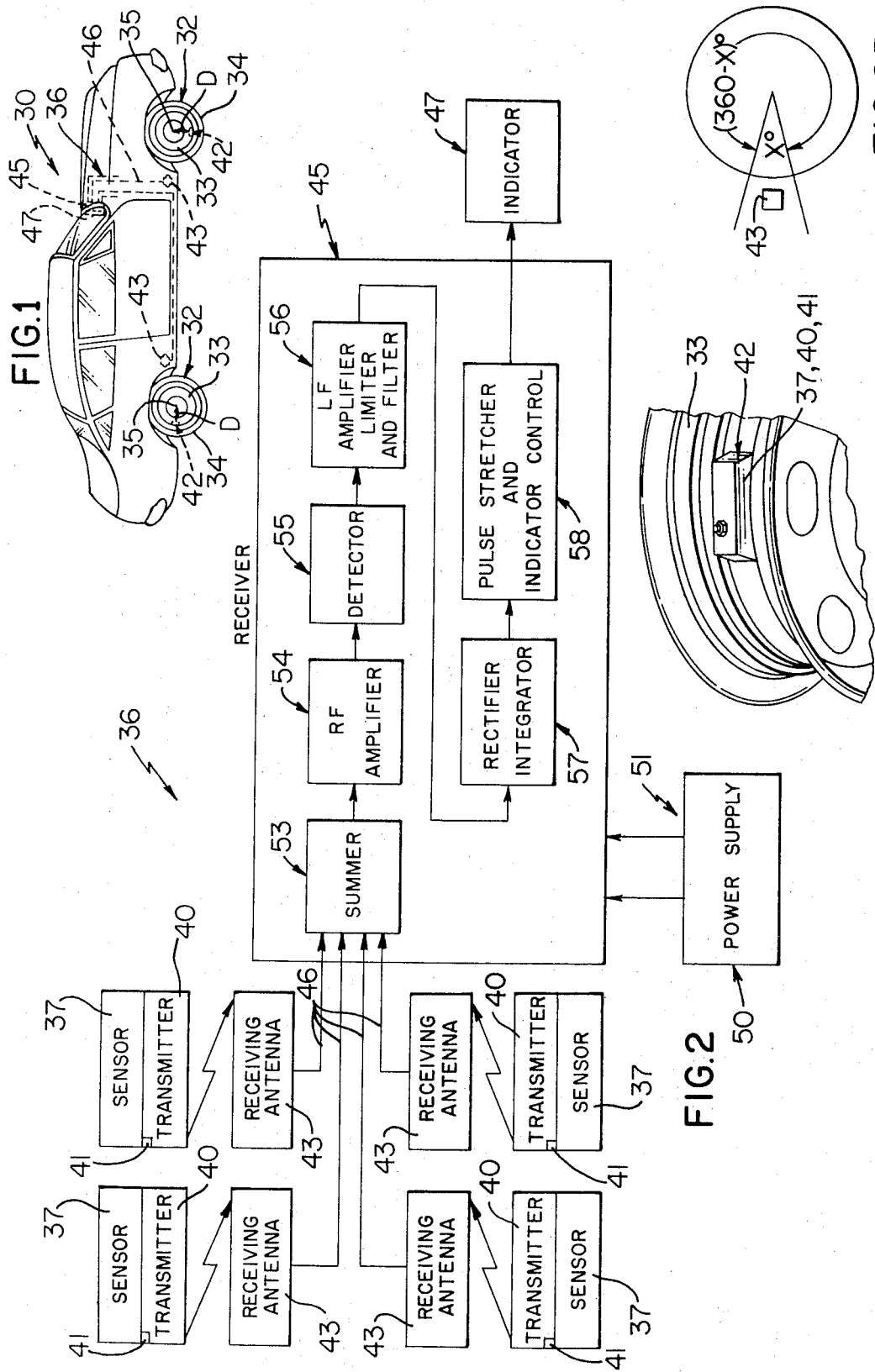

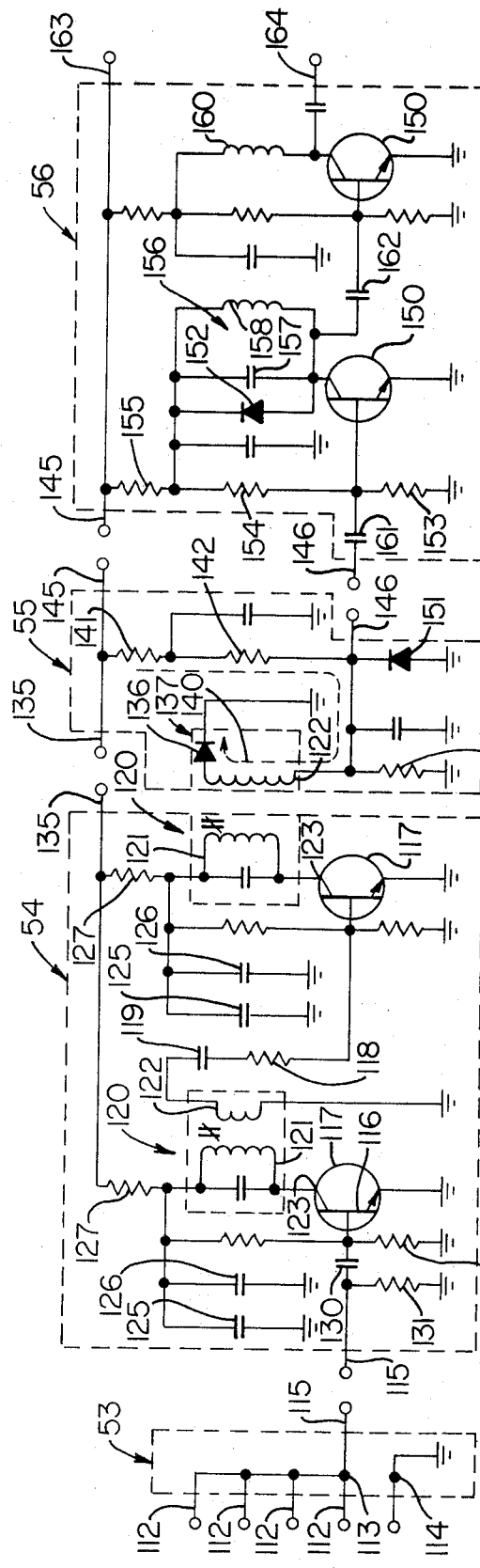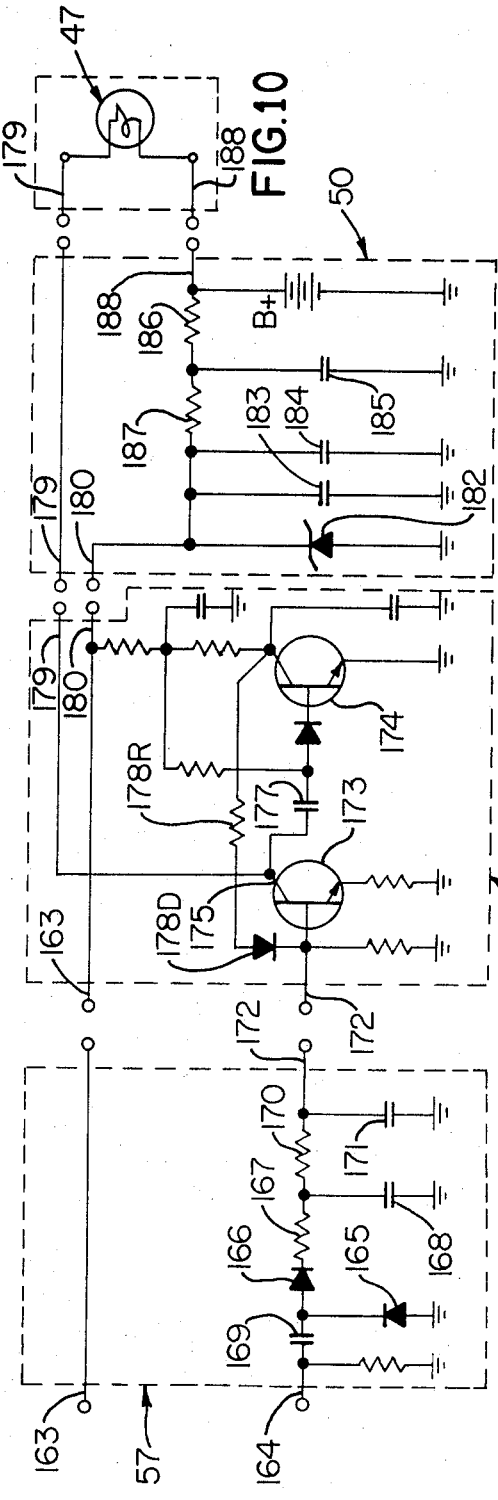

3,806,869

RF RECEIVER FOR PNEUMATIC TIRE LOW PRESSURE MONITORING AND WARNING SYSTEM

BACKGROUND OF THE INVENTION

Safe, efficient, and economical transportation by motor vehicle carried on pneumatic tires depends in large measure upon maintaining correct pneumatic pressure in all tires of each associated vehicle. In addition, in a vehicle which utilizes power steering, it is more difficult for the vehicle operator to sense a partially deflated tire. However, it is well known that failure to maintain the correct air pressure in each tire may result in excessive tire wear, blowouts, poor fuel mileage, and steering difficulties.

Numerous pneumatic tire low pressure monitoring and warning systems have been proposed heretofore. However, these systems are either too complicated and hence expensive for universal usage in a motor vehicle, incapable of providing a reliable warning signal, impractical, or are not capable of being used over extended periods without requiring excessive maintenance and repair.

SUMMARY

This invention provides an improved RF receiver for pneumatic tire low pressure monitoring and a warning system, of simple and economical construction, which employs a minimum number of component parts and is capable of providing reliable indications over extended periods of time under severe environmental conditions likely to be encountered by an associated vehicle employing such system.

In particular, the system utilizes means sensing a low pressure condition in each pneumatic tire supported on an associated vehicle by its rotatable support and a transmitter fixed to each support and being rotatable therewith and actuated by its associated sensing means to provide pulse modulated output signals with known characteristics at a radio frequency in response to the low pressure condition. A receiving antenna is attached at a fixed position on the vehicle adjacent each tire and each antenna may receive usable output signals only during a portion of each complete rotation of an associated transmitter as provided by its tire. A receiver is employed and means is employed connecting each receiving antenna to the receiver and such receiver is operatively connected to associated indicating means. The receiver may have means for increasing the effective time duration of the usable portions or ones of the output signals to thereby assure that the indicating means is actuated in response to a low pressure condition. The receiver is further arranged to reject the effects of atmospheric and man-made spurious signals while responding reliably to authentic warning signals.

Other details, uses, and advantages of this invention will be readily apparent from the embodiments thereof presented in the following specification, claims, and drawings.

BRIEF DESCRIPTION OF THE DRAWINGS

The accompanying drawings show present preferrred embodiments of this invention in which;

FIG. 1 is a perspective view illustrating an exemplary motor vehicle utilizing one embodiment of the pneumatic tire low pressure monitoring and warning system of this invention which has an improved RF receiver as an integral part thereof;

FIG. 2 is a schematic presentation of the exemplary system utilized in the vehicle of FIG. 1 wherein such system includes means sensing a low pressure condition in each pneumatic tire of the vehicle, a transmitter associated with each tire and actuated by its sensing means to provide pulsed output signals at a radio frequency, a receiving antenna operatively associated with each transmitter, an improved RF receiver operatively connected to each receiving antenna for receiving the signals from the transmitters, and an indicator for providing an indication in the event of a low pressure condition in one or more tires;

FIG. 2A is a fragmentary view of a typical assembly comprised of a sensor, transmitter, and battery mounted on the hub of one of the tires of the vehicle of FIG. 1;

FIG. 2B is a schematic diagram highlighting that each receiving antenna receives a usable signal only during an angular portion of each rotation of its associated transmitter;

FIG. 3 is a schematic showing of the exemplary summer provided in the system of FIG. 2;

FIG. 4 illustrates a schematic electrical circuit diagram of an exemplary radio frequency amplifier comprising the receiver of FIG. 2;

FIG. 5 illustrates a schematic electrical circuit diagram of an exemplary detector comprising the receiver of FIG. 2;

FIG. 6 is a schematic electrical circuit diagram of an exemplary low frequency amplifier, limiter, and filter comprising the receiver of FIG. 2;

FIG. 7 is a schematic electrical circuit diagram illustrating an exemplary rectifier-integrator comprising the receiver of FIG. 2;

FIG. 8 is a schematic electrical circuit diagram of an exemplary so-called pulse stretcher and indicator control comprising the receiver of FIG. 2;

FIG. 9 is a schematic electrical circuit diagram of an exemplary electrical power supply for the receiver of FIG. 2; and FIG. 10 is a schematic electrical circuit diagram of the indicator of FIG. 2.

DESCRIPTION OF THE OVER-ALL SYSTEM

Reference is now made to FIG. 1 of the drawings which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying an associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 30 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of a passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed on the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41, also see FIG. 3, and the sensor 37, transmitter 40, and battery 41 of each particular wheel assembly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37 is comprised of a sealed pressurized hemispherical dome which dimples in a substantial predetermined manner when it is exposed to an external pressure greater than a predetermined minimum. The dimple action serves as a normally open electrical snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as as oscillator 40, is actuated by the snap action of its senstor 37 whereby the associated battery 41 provides electrical power for the oscillator 40. The oscillator 40 is a self-pulsed oscillator which generates a radio frequency (RF) signal with distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as the electrical apparatus of the vehicle 30 is minimized. Further, because transmission basically may be considered as the coupling between a stationary coil on a receiving antenna 43 and a rotating coil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the differences in shielding interposed between the coils at different relative positions thereof. As a result of these factors the transmitted output signal from the transmitter 40 is of sufficient strength to be usable only during a portion of each revolution or rotation of its wheel assembly 32. Stated in another manner, because each receiving antenna 43 is attached at a fixed position on the vehicle adjacent its wheel assembly 32, the antenna 43 receives a usable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was slected. The system 36 utilizes a receiver 45 which is operatively connected to each receiving antenna 43 by an associated coaxial cable 46 and the receiver employs unique means for increasing the effective time duration of the usual portions of the output signals from he transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 is addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially. However, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pulse repetition rate will result in a flickering action by the lamp 47. If the vehicle 30 is moving at higher speeds the lamp 47 may be turned ON for a time period which is insufficient to insure full brightness. This performance of the lamp at higher vehicle speeds in combination with the higher pulse repetition rate due to faster rotation reduces the flickering. However, the total perceptible light may be inadequate to be used as an indicator.

To highlight this situation reference is made to FIG. 2B of the drawings wherein it is seen that for each full rotation of a wheel the transmission level is high enough to activate or light the indicator lamp 47, for X degrees while such lamp is dark for the remaining (360-X) degrees. By way of an example, X may be 30°, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator ON time or the time that it is activated is increased relative to its OFF time. In particular, the performance of the indicator 47 may be substantially improved if the effective time duration of a usable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including: power supply disturbances generated by the electrical equipment of the vehicle 30, including the starter, horn, window washer, windshield wipers, key alarms, etc.; RF signals generated by natural atmospheric electrical disturbances such as static; RF signals generated by the above-mentioned electrical equipment of the vehicle 30; RF signals generated by electrical equipment external to the vehicle; voice-modulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all of the following characteristics of being in the selected RF band, being an RF signal which is pulsating at the predetermined frequency defined by the self-pulsed oscillator, and being an RF signal which is pulsating at a rate and with a pulse width determined by the angle X of rotation over which a recognizable signal is received in combination with the rotational velocity of an associated wheel assembly 32 of the vehicle 30.

The receiver 45 has an RF pass band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. the circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will assure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of usable ones of the output signals provided to RF receiver 45 by receiving antennas 43 and insures that a satisfactory indicator signal is provided to the indicator 47 to present a distinct indication. The pulse stretcher 58 is inherently a regenerative device whereby it also increases the sensitivity of the RF receiver since any signal which is capable of activating the pulse stretcher will provide a saturated output signal. The circuit 58 activates indicator 47 to warn the operator of the vehicle 30 in the event of a low pressure condition in any one of the vehicle tires. The receiver 45 also has suitable means in its power supply 51 for filtering such power supply to reduce power supply line disturbances to a tolerable level.

Having described the general operation of the system 36 of this invention is connection with the exemplary vehicle 30, a detailed description will now be presented of the improved RF receiver of this invention and the various components comprising such receiver 45.

RECEIVER 45

The receiver 45 for the system 36 is designed for mounting to the chassis of the vehicle 30 at any suitable location. The receiver employs circuitry which may be easily assembled on a printed circuit board carried within a compact case and the circuit board is arranged to permit insertion of component parts by automatic assembly machines for production thereof in large quantities. The various component parts of the exemplary receiver 45 will now be described in detail.

SUMMARY 53

The summer 53 is illustrated schematically in FIG. 3 of the drawings and amounts to a summing junction 113 for the coaxial electrical leads 112 from all receiving antennas 43 with the shields being grounded as shown at 114. Ordinarily there is a loss in gain from this arrangement. However, such loss is readily overcome by subsequent amplifier gain in the remainder of the receiver circuit inasmuch as the thermal noise level is low compared to the signal level. In addition, the standing waves using the receiving antennae 43 are acceptable. It will be appreciated that the ideal summing system would require four parallel amplifier stages followed by summing circuitry. However, it has been found that with the system 36 such ideal summing system is not necessary whereby its added cost is avoided. The signals from the summer 53 and in particular summing junction 113 are provided to the RF amplifier 54 through an electrical lead 115.

RF AMPLIFIER 54

As seen in FIG. 4, the signals from the four receiving antennas 43 are fed through lead 115 and capacitively coupled to the base 116 of a first transistor 117 comprising the RF amplifier 54 and it will be seen that the amplifier 54 also employs a second transistor, also designated 117, which is preferably identical to the first transistor. The transistors 117 are coupled by a pair of RF transformers each designated by the reference numeral 120 having slug-tuned primaries 121 and untuned secondaries 122. The coupling between the first RF transformer 120 and the base of the second transistor 117 is controlled by a series connected resistor 118 and capacitor 119. The voltage supply for the collector 123 of each transistor 117 is separately filtered by a filter comprised in each instance of a pair of capacitors 125 and 126 and a resistor 127. In addition, the signals provided to amplifier 54 through line or lead 115 are coupled by a capacitor 130 and resistors 131 and 132 connected to the base 116 of the first transistor 117. Power to the RF amplifier 54 is supplied through a lead 135.

DETECTOR 55

The RF amplifier 54 is coupled to the detector 55 by the RF transformer 120 and it will be seen from FIG. 5 that the detector is a conventional diode detector 136 located inside the shield of the second RF transformer 120 of amplifier 54 as illustrated at 137. The diode detector 136 is forward biased as indicated by the dotted path 140 thereby facilitating its ability to perform at very low signal levels and the forward biasing of the diode 136 is assured by provision of resistors 141, 142 and 143. The output from the detector 55 is provided to the LF amplifier, limiter, and filter 56 through electrical lead 146 and ground. Power to the detector 55 is supplied through a lead 145.

LF AMPLIFIER, LIMITER AND FILTER 56

As seen in FIG. 6 of the drawings, the LF (low frequency including audio frequencies) amplifier, limiter and filter circuit 56 is operatively connected to the detector 55 by lead 146, as previously mentioned, and the electrical circuit 56 utilizes two stages of amplification each using a transistor or amplifier 150 preferably of the type which may employ the wellknown Darlington circuit which is characterized by a high-gain and a high-input impedance. The LF signal in the detector output and the collector circuit of the first amplifier 150 of circuit 56 are amplitude-limited by diode 151 (see FIG. 5) and diode 152. The diode 151 is shunted across the detector output 146. The diode 152 is shunted across the collector tank circuit 156 defined by a capacitor 157 and a coil 158.

The LF filter portion of circuit 56 is incorporated entirely within the LF amplifier circuitry. The collector load of the second LF amplifier 150 comprises an inductance or coil 160 which provides a low frequency cut-off. A coupling capacitor 161 is provided from the detector 55 to the first LF amplifier 150 and a coupling capacitor 162 is provided between the first and second amplifiers 150. The value of capacitors 161 and 162 is held at a minimum compatible with the required LF band pass. The combined action of the low pass and high pass filters serves to generate the desired band pass characteristics, which in combination with the limiters serves to restrict the frequencies which can provide an indication. The circuit 56 is connected by lead 164 to ground to the rectifier-integrator 57. Power to the LF amplifier, limiter, and filter circuit 56 is supplied through lead 163.

RECTIFIER-INTEGRATOR 57

The circut diagram for the rectifier-integrator 57 is illustrated in FIG. 7 of the drawings and is comprised of a push-pull dual rectifier (serving as a voltage doubler) defined by diode or rectifiers 165 and 166 with the usual load resistor 167 being connected downstream of the rectifier 166. The rectifier 166 serves as an integrator because it employs a comparatively large size capacitor 168 (10 microfarad, for example) which is charged through a comparatively small (generally of the order of 0.01 microfarad) capacitor 169. The circuit 57 uses a resistor 170 and a capacitor 171 as a resistive-capacitive (RC) filter. The rectifier-integrator 57 is connected to the pulse stretcher and indicator control circuit 58 by electrical lead 172 and ground.

PULSE STRETCHER AND INDICATOR CONTROL 58

The pulse stretcher and indicator control circuit 58 is illustrated in FIG. 8 of the drawings and may be considered a DC and LF amplifier stage. However, a transistor has been added to perform what will be referred to as the so-called "pulse-stretching function." The circuit 58 utilizes a power transistor 173 which is normally OFF and what will be referred to as a control transistor 174 which is normally ON. Under conditions where the rectifier-integrator circuit 57 and in particular the capacitor 168 of such circuit provides a positive output voltage through line 172 which is of sufficient level to turn the power transistor 173 ON, this will cause the voltage across its collector 175 to drop.

As previously indicated the control transistor 174 is biased to be normally ON. However, when the power transistor 173 is turned ON a negative pulse is fed to the base of the control transistor 174 and will turn if OFF. The increased control transistor collector voltage will feed base current to the power transistor 173 through diode 178D and resistor 178R and maintain it in an ON condition. However, a coupling capacitor 177 is provided and will proceed to discharge so that when capacitor 177 is discharged the control transistor 174 will turn ON and thereby turn the power transistor 173 OFF. As a result, all signals or pulses, regardless of their initial length or time duration, will be stretched by the action of the coupling capacitor 177 to a predetermined time duration which in one application of the system of this invention were stretched to approximately 40 milliseconds.

The above-described increased time duration assures that the indicator 47 operatively connected to circuit 58 is positively activated in response to a low pressure condition in any one of the tires monitored by the system 36. Further, because of the operating characteristics of transistor 173 it will only be activated by a voltage level which is sufficiently high that only a low pressure condition in a tire could cause such a voltage level and not some other condition, due to the combined action of the band-pass and limiter characteristic of the LF amplifier, limiter, and filter 56.

The indicator 47 is controlled by the power transistor 173 and such indicator, shown in FIG. 10, is in the form of a lamp which will also be referred to as a lamp 47 and in a manner to be described subsequently. The circuit 58 is connected to the power supply 50 by leads 179 and 180 and ground.

POWER SUPPLY 50

As illustrated in FIG. 9 of the drawings the power supply circuit 50 comprises the battery of the vehicle 30 which will be designated B+ and provides a voltage generally of the order of +15 volts. The circuit 50 also includes means for providing a 9 volt regulated supply and such means is defined by a Zener diode 182 which provides the voltage regulation function and has an RC filter defined by capacitors 183, 184 and 185 and resistors 186 and 187. The 9 volt potential is supplied to all portions of the receiver 45 through lead 180. However, one side of the lamp 47 is connected directly to the B+ 15 volt supply by a lead 188.

The other side of lamp 47 is connected by lead 179 to circuit 58. In particular, it will be seen that lamp 47 is connected to the collector 175 of power transistor 173 whereby transistor 173 serves to turn the lamp 47 ON and OFF with the ON time being stretched by the cooperating action of capacitor 177 and transistor 174, combined with the feed back circuit diode 178D and resistor 178R.

While present exemplary embodiments of this invention, and methods of practicing the same, have been illustrated and described, it will be recognized that this invention may be otherwise variously embodied and practiced within the scope of the following claims.

What is claimed is:

1. In combination with a pneumatic tire low pressure monitoring and warning system having a plurality of selectively actuated transmitters, each carried off center by an associated rotary pneumatic tire support and being rotated therewith at a distance from the central axis of rotation, each of said transmitters generating in response to low pressure within the tire a pulse modulated RF signal within a preselected RF band, said RF signals being pulse modulated with a rate falling within a preselected pulse frequency band; a plurality of receiving antennas, each respectively attached in a fixed position adjacent an associated rotating transmitter within the near field of and coupled therewith, said coupling being subject to large variations resulting from differences in distance, orientation and shielding, said receiving antennas receiving usable radio frequency signals comprising a train of pulses during each small portion of each complete rotation of an associated transmitter therepast when said coupling is maximized, an RF receiver for the reliable reception and display of recognizable RF signals within a preselected RF band while rejecting the effects of power supply disturbances as well as atmospheric and man-made RF signals not in conformance with the characteristics of the recognizable RF signals, an RF transmission line operatively connecting each antenna with said RF receiver, and indicating means operatively connected with the receiver to provide an indication of low pressure, a power supply for providing voltage controlled and filtered power, said RF receiver comprising a summer receiving the RF signals from said RF transmission lines; a tunable RF amplifier to provide a first selection of said recognizable signals and amplification to insure efficient amplitude detection; an amplitude detector for the demodulation of said pulse modulated recognizable RF signals; an LF amplifier, limiter and filter for making a second selection of said recognizable RF signals by the attenuation of LF signals outside said pulse frequency band; a rectifier-integrator for said pulse trains to provide a third selection of said recognizable RF signals and to generate a first control signal; said indicating means providing an inadequate indication when said first control signal is used to control said indicting means directly; and pulse stretching means for generating a second control signal having pulses with the same pulse repetition rate as the first control signal wherein said effective pulses are of substantially longer duration; and a power output transistor for energizing said indicating means, said power transistor also comprising an active portion of said pulse stretcher.

2. An RF receiver as set forth in claim 1 in which said summer provides a direct parallel connection of all said RF transmission lines to said RF receiver, and in which said receiver provides increased amplification in the downstream circuitry to compensate for the RF signal power loss due to the mutual loading of said multiple transmission lines.

3. An RF receiver as set forth in claim 2 in which said RF amplifier is comprised of a plurality of shielded RF transformer coupled transistor amplifiers, said RF transformers having magnetic slug tuned primary windings and untuned secondary windings to provide a minimal RF band compatible with the assured inclusion of said entire selected RF band.

4. An RF receiver as set forth in claim 3 in which said amplitude detector comprises a forward biased diode amplitude detector to facilitate its performance at low voltage levels thereby permitting the use of a minimal amount of RF amplication and wherein said diode has its cathode grounded and is housed within the downstream one of said shielded RF transformers to minimize extraneous feedback.

5. An RF receiver as set forth in claim 1 in which said LF amplifier, limiter and filter comprise a plurality of capacity coupled transistor amplifiers, wherein the collector loads comprise capacity-inductance tuned tank circuitry thereby defining a minimal LF pass band with the assumed inclusion of the selected pulse repetition frequency band; and diode connected across the signal path to limit the pulse voltage amplitude.

6. An RF receiver as set forth in claim 5 in which said receiver has a capacity loaded diode rectifier-integrator provided downstream from said LF amplifier, limiter and filter to assure that an effective first control signal is only generated when the output signal from said LF amplifier, limiter and filter comprise at least a minimum number of pulses in said pulse trains.

7. An RF receiver as set forth in claim 6 in which said rectifier-integrator is comprised of a push-pull dual rectifier defined by a pair of cooperative diodes, coupling and storage capacitors and a load resistor to provide a substantially greater pulse peak of the first control voltage and correspondingly higher gain.

8. An RF receiver as set forth in claim 7 in which said indicating means provides an inadequate indication when said first control voltage is used to control the current through said indicating means without altering its waveshape; and in which said pulse stretching means comprises a power transistor for which the collector load controls said indicating means, said power transistor being normally OFF with its base connected to the output of said rectifier-integrator and, therefore, initially controlled by said first control signal; and a control transistor which is normally ON, said control transistor having a coupling capacitor connected from the junction of the said indicating means and said power transistor collector to the base of said control transistor with its collector connected to the base of said power transistor; said coupling capacitor serving to increase the ON time of said power transistor an amount equal to the time required for the said coupling capacitor to discharge, thereby generating a second control signal, which will provide effective pulses of substantially greater duration, to provide a reliable indication.

9. An RF receiver as set forth in claim 8 in which said indicating means is an incandescent filament lamp.

10. An RF receiver as set forth in claim 9 in which operating power is provided by the storage battery of an associated vehicle; resistance-capacitance filtering means to prevent power supply disturbances from reaching and interfering with the reliable operation of said RF receiver circuitry; and voltage regulator means for the control of the supply voltage for all circuit elements of said RF receiver with the exception of said power output stage.

11. An RF receiver as set forth in claim 10 in which said voltage regulator comprises a Zener diode.

* * * * *